July 15, 1952 — J. R. WILLIAMS — 2,602,938
FOLDING AUTOMOBILE BED
Filed Feb. 4, 1948 — 2 SHEETS—SHEET 1

Jefferson R. Williams
INVENTOR.

July 15, 1952 J. R. WILLIAMS 2,602,938
FOLDING AUTOMOBILE BED
Filed Feb. 4, 1948 2 SHEETS—SHEET 2
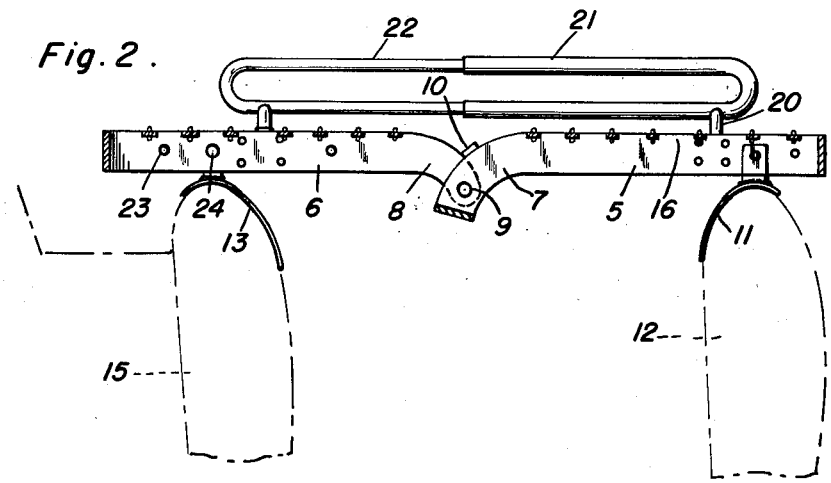
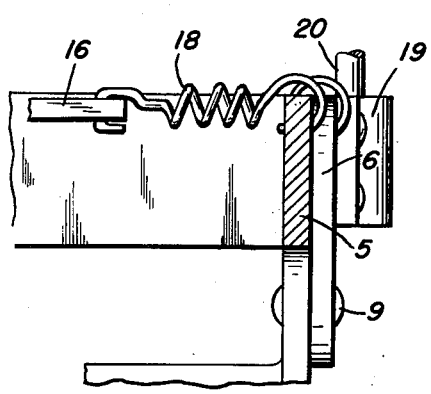
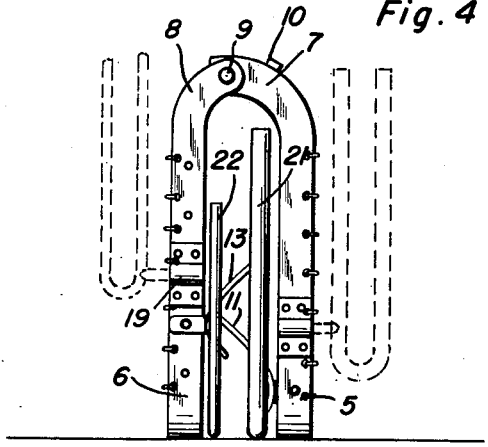
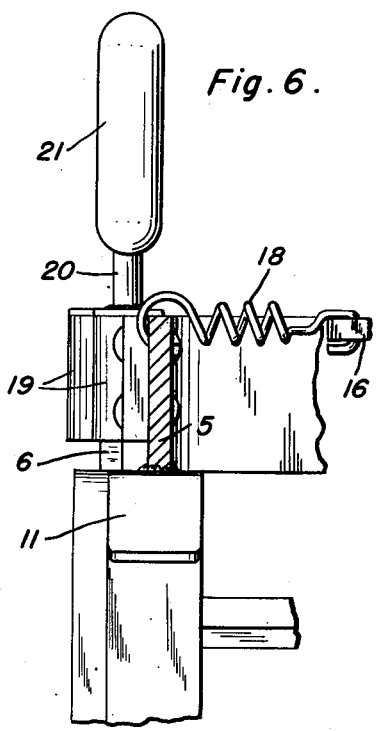
Jefferson R. Williams
INVENTOR.

Patented July 15, 1952

2,602,938

UNITED STATES PATENT OFFICE 2,602,938

FOLDING AUTOMOBILE BED

Jefferson R. Williams, Jackson, Mich.

Application February 4, 1948, Serial No. 6,319

1 Claim. (Cl. 5—118)

The present invention relates to new and useful improvements in automobile beds and more particularly to a foldable bed for infants or children.

An important object of this invention is to provide an automobile bed including a pair of foldable springs for supporting a mattress or sleeping pad thereon when in open position and embodying means for supporting the frames upon the front and rear seats of an automobile.

A further object of the invention is to provide removable side rails for the bed which serve to hold the frames in an open position.

A still further object is to provide a foldable automobile bed which may be folded into a compact form for conveniently carrying in the car when not in use.

A still further object is to provide a device of this character of simple and practical construction, which is strong and durable, neat and attractive in appearance, relatively inexpensive to manufacture and otherwise well adapted for the purposes for which the same was intended.

Other objects and advantages reside in the details of construction and operation as more fully hereinafter described and claimed, reference being had to the accompanying drawings forming part hereof, wherein like numerals refer to like parts throughout, and in which:

Figure 2 is a longitudinal sectional view taken substantially on a line 2—2 of Figure 1;

Figure 4 is a side elevational view showing the bed in folded position;

Figure 5 is an enlarged fragmentary sectional view taken substantially on a line 5—5 of Figure 1; and Figure 6 is an enlarged vertical sectional view taken on a line 6—6 of Figure 1.

Figure 1:
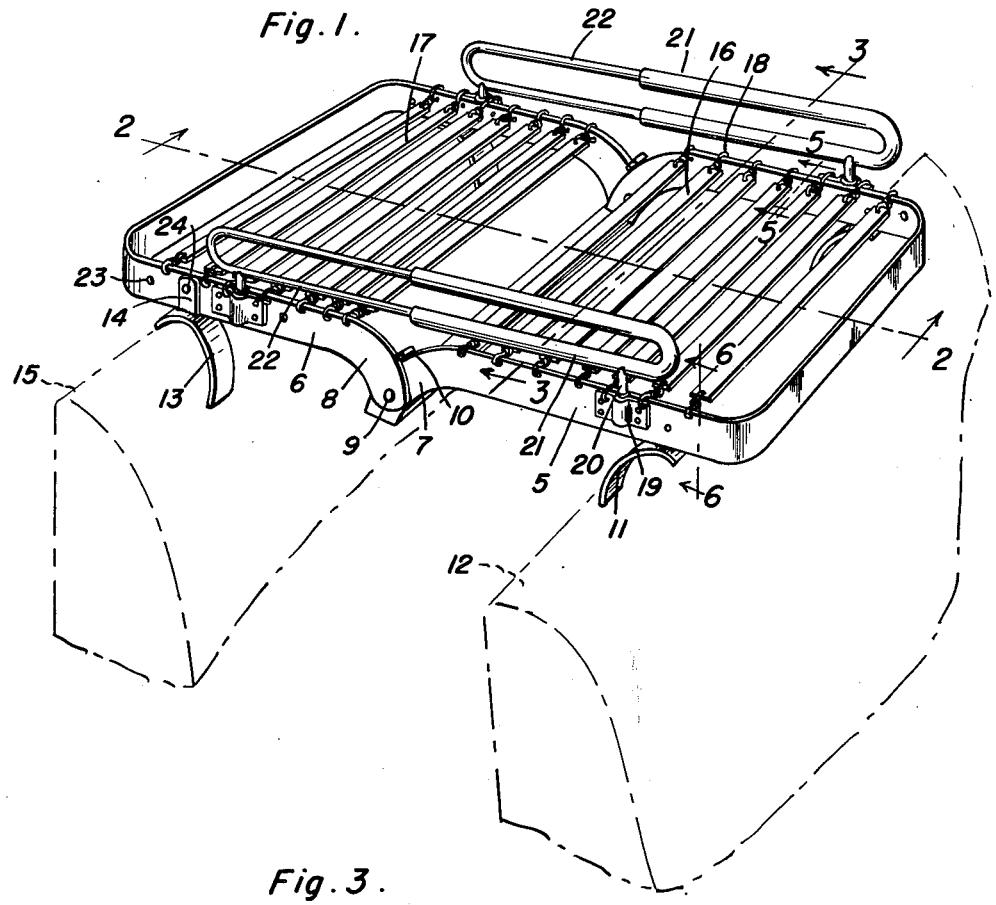
Figure 1 is a perspective view showing the bed in open position.
Figure 3:
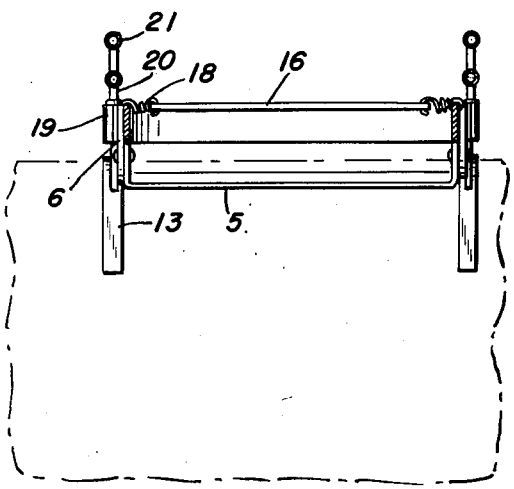
Figure 3 is a transverse sectional view taken substantially on a line 3—3 of Figure 1.

Referring now to the drawings in detail wherein for the purpose of illustration I have disclosed a preferred embodiment of the invention the numerals 5 and 6 designate a pair of frame members preferably constructed of suitable metal, the frame 5 being of rectangular form and having its side members at one end bent downwardly as shown at 7. The frame member 6 is of U-shaped construction and likewise has its end portions 8 bent downwardly and pivoted to the downwardly bent end portion 7 of the frame 5 by pins 9 or the like.

The frame members 5 and 6 provide a bed frame which is foldable by swinging the frame members downwardly on the pivot 9 into substantially parallel relation as shown in Figure 4 of the drawings. The upper edge of the side members of the frame 5 at the curved portion 7 thereof are provided with stops 10 for engagement by the upper end of the downwardly curved end portions 8 of the frame 6 to hold the frames in a horizontal position and to prevent breaking of the pivoted ends of the frame downwardly. A pair of supports 11 preferably of strap metal are welded or otherwise suitably secured to the underside of the side members of the front frame 5 and are curved downwardly at their rear ends to conformably seat on the top of the front seat 12 of an automobile. Similar supports 13 are secured to the sides of the rear frame member 6 by upstanding plates 14 bolted or otherwise suitably secured to the rear frame, the rear supports 13 likewise conforming to the upper edge of the rear seat 15 for resting thereon whereby to support the frames 5 and 6 in a horizontal position on the front and rear seats.

A plurality of flat springs 16 of strap metal extend transversely of the front frame 5 and similar springs 17 extend transversely of the rear frame 6. Coil springs 18 are attached to the ends of the springs 16 and 17 for attaching to the side members of the frames 5 and 6 in spaced parallel relation with respect to each other to provide resilient slats forming a bed spring on which a mattress or other sleeping pad may be placed.

The side members of the front and rear frames 5 and 6 are provided with sockets 19 in which pegs 20 are removably received. A horizontal U-shaped guard rail 21 of tubular metal is welded to each peg 20 of the front frame 5 and a horizontal U-shaped guard rail 22 is welded to each peg 20 of the rear frame 6 with its ends telescoping in the ends of the adjacent guard rail 21 to provide a continuous guard rail at each side of the frames when in open position.

In the operation of the device the frames 5 and 6 are swung into a horizontal position and the pegs 20 of the telescoping guard rails 21 and 22 inserted in the sockets 19. The front and rear supports 11 and 13 are then seated on the upper edges of the front and rear seats of an automobile to support the frames in a horizontal position on the seats.

The rear frame 6 is provided with longitudinally spaced apart openings 23 for selectively receiving an attaching bolt 24 carried by the plate 14 of each rear support 13 to adjust the rear supports on different types of automobiles.

The frames 5 and 6 are of suitable width to provide a bed frame for an infant or child without interfering with the driver of the car or with the passengers occupying the seats.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

In a folding bed, a frame comprising a pair of frame members having outer ends, and sides terminating in inner ends, pivots connecting the inner ends of one frame member to the inner ends of the other frame member for unfolding and folding of said members into and from horizontal position, and means to hold said frame members horizontal when unfolded comprising a pair of continuous guard rails surmounting the sides of said frame members parallel therewith at opposite sides of the frame, a pair of rail attaching pins depending from each guard rail at opposite ends thereof, and pin receiving sockets on the sides of said frame members for attaching said pins to said sides in order to attach said rails to the frame and from which sockets said pins are slidably removable for detaching said rails to provide for folding of said frame members, said sockets being disposed upon opposite sides of said pivots whereby when said pins are attached said rails hold said frame members rigid, said guard rails each comprising a pair of U-shaped sections, the legs of adjacent pairs telescoping for attachment together to form a rigid rail and detachable from each other by pulling them apart when said rails are detached from said frame whereby to shorten said rails for storage in a small space with the folded frame members.

JEFFERSON R. WILLIAMS.

REFERENCES CITED

The following references are of record in the file of this patent:

UNITED STATES PATENTS

| Number | Name | Date |
|---|---|---|
| 1,171,029 | Dutour | Feb. 8, 1916 |
| 1,172,633 | Roff | Feb. 22, 1916 |
| 1,316,662 | Winzeler | Sept. 23, 1919 |
| 1,323,201 | Purcell | Nov. 25, 1919 |
| 1,917,777 | Scott | July 11, 1933 |

FOREIGN PATENTS

| Number | Country | Date |
|---|---|---|
| 4,914 | Switzerland | Oct. 30, 1897 |
| 50,186 | Switzerland | Nov. 16, 1909 |